United States Patent
Nakamura et al.

(10) Patent No.: US 11,524,337 B2
(45) Date of Patent: Dec. 13, 2022

(54) POWDER FOR ADDITIVE MANUFACTURING, ADDITIVELY MANUFACTURED BODY, METHOD FOR PRODUCING ADDITIVELY MANUFACTURED BODY, AND METHOD FOR PRODUCING METAL SINTERED BODY

(71) Applicant: SEIKO EPSON CORPORATION, Tokyo (JP)

(72) Inventors: Hidefumi Nakamura, Aomori (JP); Atsushi Nakamura, Aomori (JP); Toshiki Sano, Aomori (JP); Naoko Shima, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/016,493

(22) Filed: Sep. 10, 2020

(65) Prior Publication Data

US 2021/0069785 A1 Mar. 11, 2021

(30) Foreign Application Priority Data

Sep. 10, 2019 (JP) .............................. JP2019-164705

(51) Int. Cl.
| | | |
|---|---|---|
| *B22F 10/14* | (2021.01) | |
| *B22F 3/10* | (2006.01) | |
| *B33Y 70/00* | (2020.01) | |
| *B33Y 10/00* | (2015.01) | |
| *B33Y 70/10* | (2020.01) | |

(Continued)

(52) U.S. Cl.
CPC ................ *B22F 10/14* (2021.01); *B22F 1/05* (2022.01); *B22F 1/10* (2022.01); *B22F 1/16* (2022.01); *B22F 3/1021* (2013.01); *B33Y 10/00* (2014.12); *B33Y 70/00* (2014.12); *B33Y 70/10* (2020.01); *B33Y 80/00* (2014.12)

(58) Field of Classification Search
CPC .... B22F 3/1021; B22F 1/0059; B22F 1/0011; B22F 1/02; B22F 10/16; B22F 1/0062; B22F 1/0014; Y02P 10/25; B33Y 10/00; B33Y 70/00; B33Y 70/10
See application file for complete search history.

(56) References Cited

U.S. PATENT DOCUMENTS

| | | | |
|---|---|---|---|
| 10,322,543 B2 | 6/2019 | Ooba et al. | |
| 2006/0251535 A1* | 11/2006 | Pfeifer | ................. B22F 1/0062 419/36 |

(Continued)

FOREIGN PATENT DOCUMENTS

| | | |
|---|---|---|
| CN | 108752014 A | 11/2018 |
| WO | 2015151832 A1 | 10/2015 |

OTHER PUBLICATIONS

Final Office Action for CN application No. CN202010934522.4 dated, 6 pages of office action, 8 pages of translation.

*Primary Examiner* — Rebecca Janssen
(74) *Attorney, Agent, or Firm* — Chip Law Group

(57) ABSTRACT

A powder for additive manufacturing, which is a powder to be used in a three-dimensional additive manufacturing method, including a plurality of coated particles containing metal particles, and resin coating films that cover the metal particles and contain a caking additive, wherein $0.0001 \leq t/D50 \leq 0.0010$ in which t is an average thickness of the resin coating films and D50 is an average particle diameter of the metal particles.

8 Claims, 6 Drawing Sheets

(51) Int. Cl.
*B22F 1/05* (2022.01)
*B22F 1/10* (2022.01)
*B33Y 80/00* (2015.01)
*B22F 1/16* (2022.01)

(56) References Cited

U.S. PATENT DOCUMENTS

2020/0058820 A1* 2/2020 Hoerteis ............. H01L 31/1884
2021/0197257 A1* 7/2021 Kasperchik ............. B22F 12/00
2021/0221994 A1* 7/2021 Chen ....................... B22F 10/14

* cited by examiner

POWDER FOR ADDITIVE MANUFACTURING, ADDITIVELY MANUFACTURED BODY, METHOD FOR PRODUCING ADDITIVELY MANUFACTURED BODY, AND METHOD FOR PRODUCING METAL SINTERED BODY

The present application is based on, and claims priority from JP Application Serial Number 2019-164705, filed on Sep. 10, 2019, the disclosure of which is hereby incorporated by reference herein in its entirety.

BACKGROUND

1. Technical Field

The present disclosure relates to a powder for additive manufacturing, an additively manufactured body, a method for producing an additively manufactured body, and a method for producing a metal sintered body.

2. Related Art

As a technique for manufacturing a three-dimensional object, recently, an additive manufacturing method using a metal powder is becoming widespread. For example, WO 2015/151832 (Patent Document 1) discloses a three-dimensional manufacturing apparatus for producing a three-dimensional manufactured object by alternately performing an action of spraying a powder material onto a manufacturing table and an action of ejecting a binder from an inkjet head onto the sprayed powder material so as to bind the powder material. Further, Patent Document 1 discloses that the produced three-dimensional manufactured object is fired.

When a metal powder is used as the powder material, by firing the produced three-dimensional manufactured object, a three-dimensional metal sintered body can be obtained.

Recently, in a three-dimensional manufacturing technique, the particle diameter of the metal powder to be used is required to be made finer. However, a fine metal powder has a high bulk density, and therefore, it is necessary to use a binder in a larger amount than for a coarse metal powder. Therefore, when a manufactured object produced by the three-dimensional manufacturing apparatus is subjected to a degreasing treatment, it is necessary to remove a large amount of the binder. As a result, there occurs a problem that it takes a long time for the degreasing treatment or a problem that a large amount of the binder remains in the metal sintered body.

SUMMARY

A powder for additive manufacturing according to an application example of the present disclosure is a powder for additive manufacturing to be used in a three-dimensional additive manufacturing method and includes a plurality of coated particles containing metal particles, and resin coating films that cover the metal particles and contain a caking additive, wherein $0.0001 \leq t/D50 \leq 0.0010$ in which t is an average thickness of the resin coating films and D50 is an average particle diameter of the metal particles.

DESCRIPTION OF EXEMPLARY EMBODIMENTS

Hereinafter, preferred embodiments of a powder for additive manufacturing, an additively manufactured body, a method for producing an additively manufactured body, and a method for producing a metal sintered body according to the present disclosure will be described in detail with reference to the accompanying drawings.

1. Method for Producing Additively Manufactured Body and Method for Producing Metal Sintered Body First, a method for producing a metal sintered body according to an embodiment, and a method for producing an additively manufactured body according to an embodiment included therein will be described.

Figure 1:
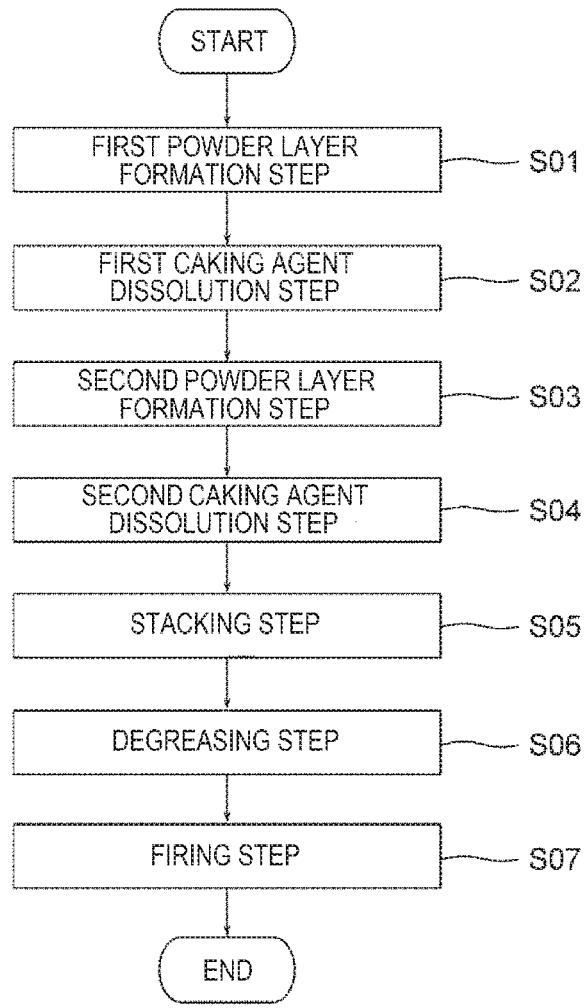
FIG. 1 is a process chart showing a method for producing a metal sintered body including a method for producing an additively manufactured body according to an embodiment.
Figure 9:
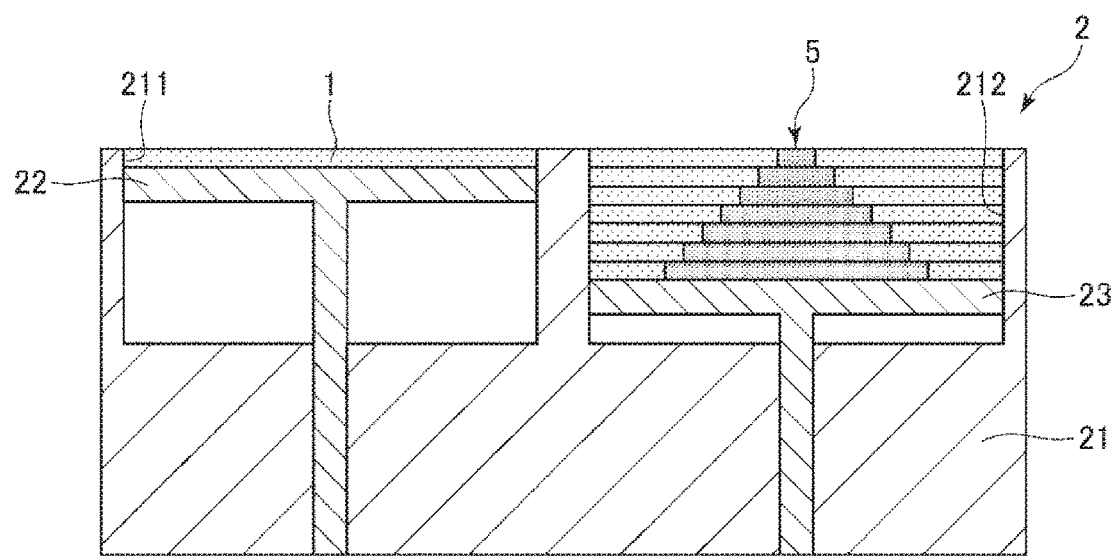
FIG. 9 is a diagram for illustrating the method for producing an additively manufactured body according to the embodiment.
Figure 10:
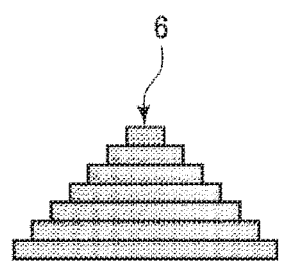
FIG. 10 is a diagram for illustrating a method for producing a metal sintered body according to the embodiment.
Figure 11:
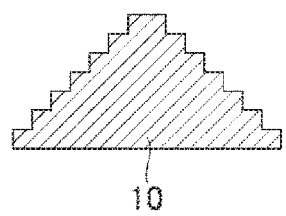
FIG. 11 is a diagram for illustrating the method for producing a metal sintered body according to the embodiment.
Figure 12:
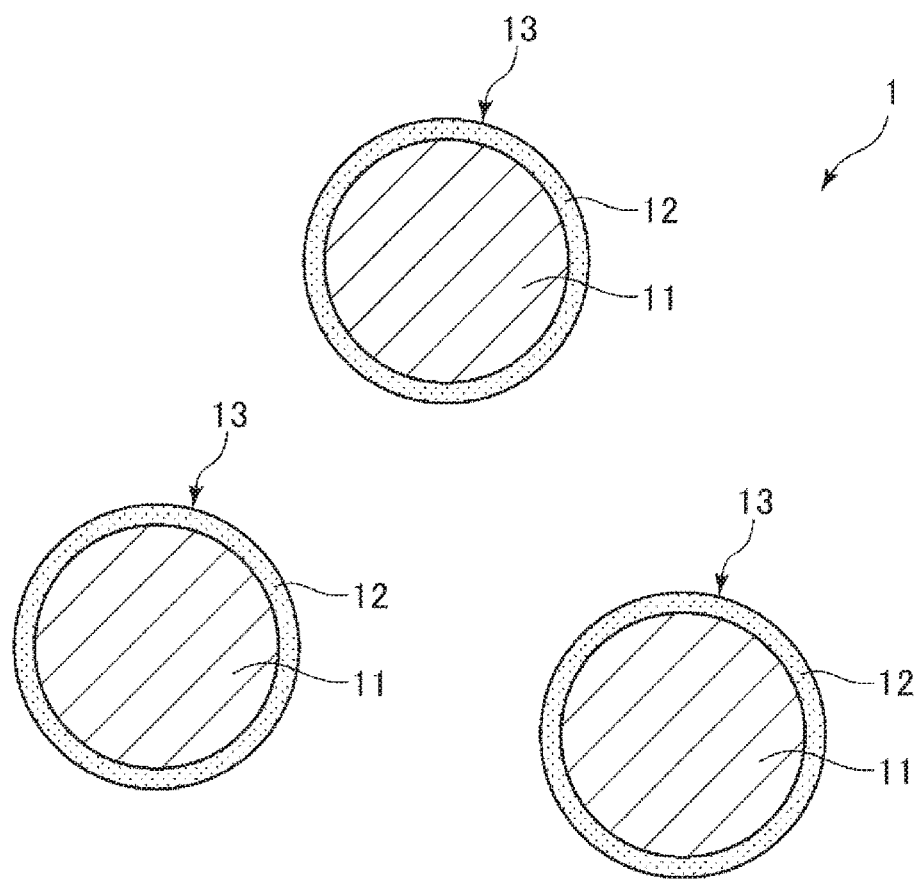
FIG. 12 is a cross-sectional view schematically showing each particle of a powder for additive manufacturing according to the embodiment.

FIG. 1 is a process chart showing a method for producing a metal sintered body including a method for producing an additively manufactured body according to an embodiment. FIGS. 2 to 9 are each a diagram for illustrating the method for producing an additively manufactured body according to the embodiment. FIGS. 10 and 11 are each a diagram for illustrating the method for producing a metal sintered body according to the embodiment. FIG. 12 is a cross-sectional view schematically showing each particle of a powder for additive manufacturing according to the embodiment.

The method for producing an additively manufactured body according to an embodiment includes a first powder layer formation step S01 of forming a first powder layer 31, a first caking additive dissolution step S02 of dissolving a caking additive in the first powder layer 31, thereby obtaining a first binded body 41, a second powder layer formation step S03 of forming a second powder layer 32, a second caking additive dissolution step S04 of dissolving a caking additive in the second powder layer 32, thereby obtaining a second binded body 42, and a stacking step S05 of repeating the second powder layer formation step S03 and the second caking additive dissolution step S04 once or twice or more, thereby obtaining an additively manufactured body 5.

Further, the method for producing a metal sintered body according to an embodiment includes the first powder layer formation step S01 to the stacking step S05 for performing the method for producing an additively manufactured body as described above, a degreasing step S06 of subjecting the additively manufactured body 5 to a degreasing treatment, thereby obtaining a degreased body 6, and a firing step S07 of firing the degreased body 6, thereby obtaining a metal sintered body.

Hereinafter, the respective steps will be sequentially described.

1.1 Additive Manufacturing Apparatus

First, prior to the description of the method for producing an additively manufactured body, an additive manufacturing apparatus 2 that can be used in the method will be described.

As shown in FIGS. 2 to 9, the additive manufacturing apparatus 2 includes an apparatus body 21 having a powder storage portion 211 and a manufacturing portion 212, a powder supply elevator 22 provided in the powder storage portion 211, a manufacturing stage 23 provided in the manufacturing portion 212, and a coater 24 and a solution supply portion 25, each provided movably on the apparatus body 21.

The powder storage portion 211 is provided in the apparatus body 21, and is a recess portion with an open top. In the powder storage portion 211, a powder for additive manufacturing 1 is stored. Then, an appropriate amount of the powder for additive manufacturing 1 stored in the powder storage portion 211 is configured to be supplied to the manufacturing portion 212 by the coater 24.

Further, at a bottom of the powder storage portion 211, the powder supply elevator 22 is disposed. The powder supply elevator 22 is configured to be movable in the vertical direction in FIGS. 2 to 9 in a state where the powder for additive manufacturing 1 is placed thereon. By allowing the powder supply elevator 22 to move upward, the powder for additive manufacturing 1 placed on the powder supply elevator 22 is pushed up so as to be able to protrude from the powder storage portion 211. According to this, the protruding portion of the powder for additive manufacturing 1 can be moved to the manufacturing portion 212 side as described later.

The manufacturing portion 212 is provided contiguous to the powder storage portion 211 of the apparatus body 21, and is a recess portion with an open top. In the manufacturing portion 212, the powder for additive manufacturing 1 supplied from the powder storage portion 211 is spread in the form of a layer with the coater 24.

Further, at a bottom of the manufacturing portion 212, the manufacturing stage 23 is disposed. The manufacturing stage 23 is configured to be movable in the vertical direction in FIGS. 2 to 9 in a state where the powder for additive manufacturing 1 is spread thereon. By appropriately setting the height of the manufacturing stage 23, the amount of the powder for additive manufacturing 1 to be spread on the manufacturing stage 23, that is, the thickness of the first powder layer 31 can be adjusted.

The coater 24 is configured to be movable in the horizontal direction in FIGS. 2 to 9 from the powder storage portion 211 to the manufacturing portion 212. By dragging the powder for additive manufacturing 1 with the movement thereof, the powder for additive manufacturing 1 can be spread in the form of a layer on the manufacturing stage 23.

The solution supply portion 25 is, for example, constituted by an inkjet head, a dispenser, or the like, and is configured to be two-dimensionally movable in the horizontal direction and the paper thickness direction in FIGS. 2 to 9 in the manufacturing portion 212. Then, the solution supply portion 25 can supply a desired amount of a solvent 4 to a desired position of the first powder layer 31 or the second powder layer 32.

1.2 First Powder Layer Formation Step S01

Next, the first powder layer formation step S01 using the above-mentioned additive manufacturing apparatus 2 will be described.

Figure 2:
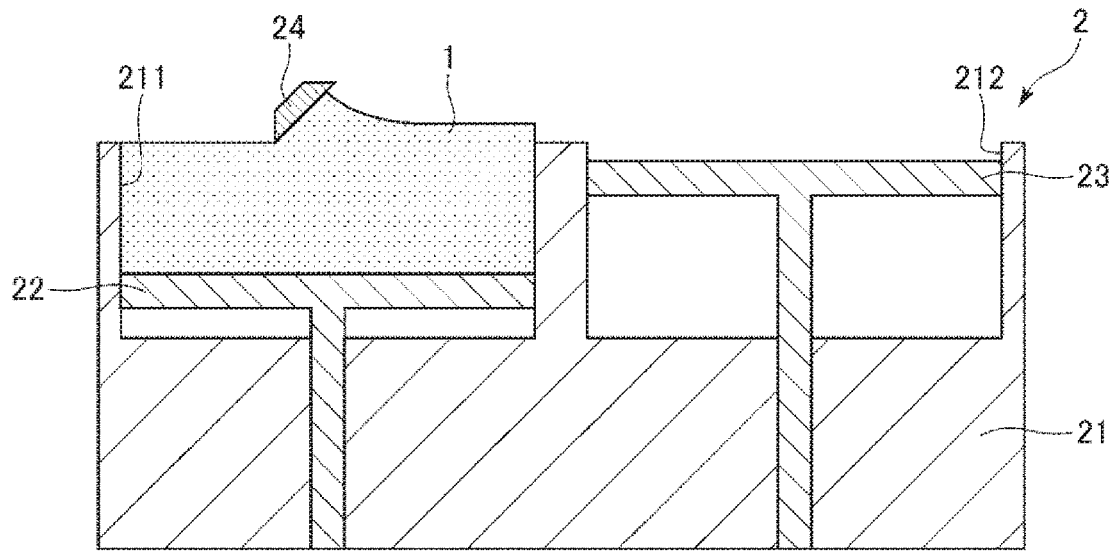
FIG. 2 is a diagram for illustrating the method for producing an additively manufactured body according to the embodiment.
Figure 3:
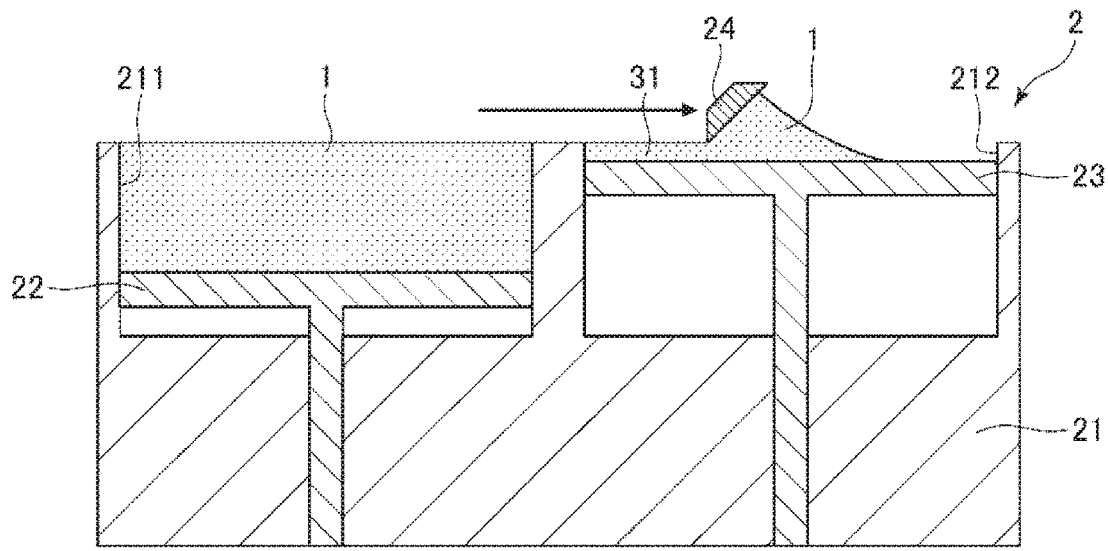
FIG. 3 is a diagram for illustrating the method for producing an additively manufactured body according to the embodiment.
Figure 4:
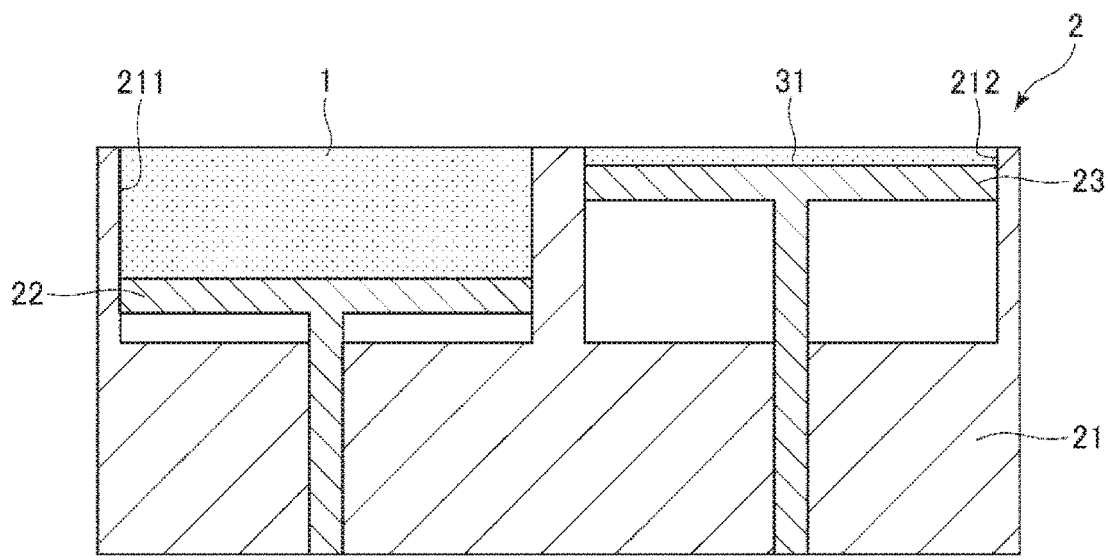
FIG. 4 is a diagram for illustrating the method for producing an additively manufactured body according to the embodiment.

First, the powder for additive manufacturing 1 is spread on the manufacturing stage 23, thereby forming the first powder layer 31. Specifically, as shown in FIGS. 2 and 3, by using the coater 24, the powder for additive manufacturing 1 stored in the powder storage portion 211 is dragged onto the manufacturing stage 23 and leveled to a uniform thickness. By doing this, the first powder layer 31 shown in FIG. 4 is obtained. At that time, the thickness of the first powder layer 31 can be adjusted by slightly lowering the upper face of the manufacturing stage 23 from the upper end of the manufacturing portion 212 in advance so as to ensure a space to be filled with the powder for additive manufacturing 1 and also appropriately set the thickness of the space.

As will be described in detail later, the powder for additive manufacturing 1 includes coated particles 13 each containing a metal particle 11 and a resin coating film 12 that covers the metal particle 11 and contains a caking additive as shown in FIG. 12. The caking additive is a substance exhibiting a joining property by being dissolved in the solvent 4 to be supplied in the below-mentioned step. By dissolving the caking additive, the metal particles 11 can be joined to one another. Then, by such joining, the additively manufactured body 5 to be finally obtained has predetermined shape retainability.

1.3 First Caking Additive Dissolution Step S02

Figure 5:
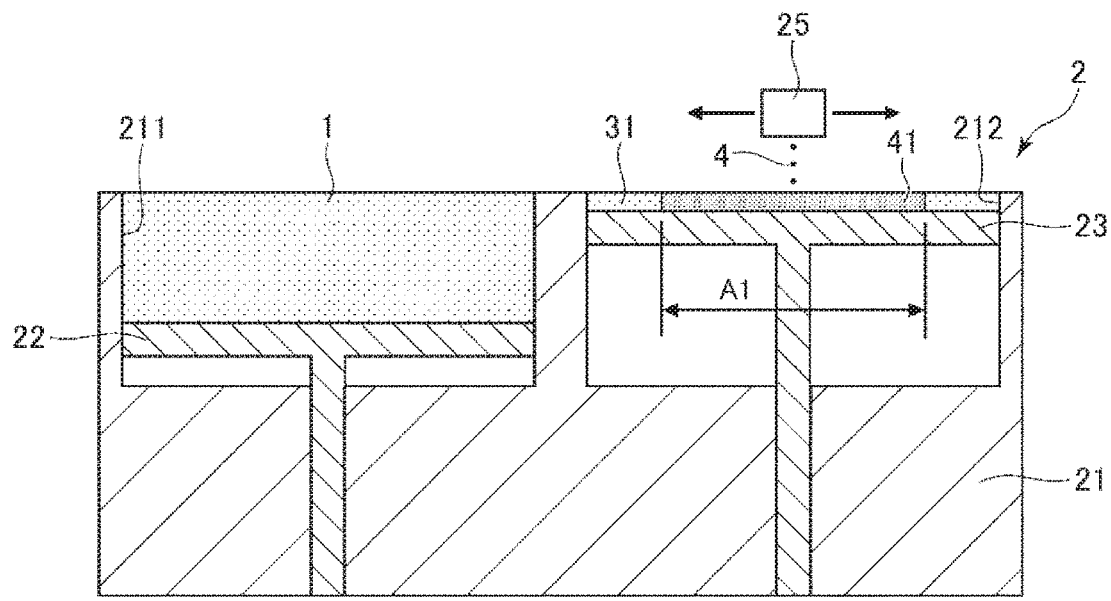
FIG. 5 is a diagram for illustrating the method for producing an additively manufactured body according to the embodiment.

Subsequently, as shown in FIG. 5, the solvent 4 is supplied to a desired supply area A1 of the first powder layer 31 while two-dimensionally scanning the solution supply portion 25. By doing this, the caking additive in the resin coating films 12 is dissolved in the coated particles 13 in the supply area A1 in the first powder layer 31. As a result, the resin coating films 12 exhibit a joining property, so that the metal particles 11 are joined to one another through the dissolved material of the caking additive. In this manner, the first binded body 41 located in the supply area A1 is obtained. The first binded body 41 is a body obtained by selectively joining the coated particles 13 in the first powder layer 31 in the supply area A1, and has shape retainability at least to such an extent that the body is not collapsed by its own weight. On the other hand, the area other than the supply area A1 in the first powder layer 31 has almost no shape retainability.

The solvent 4 is not particularly limited as long as it is a liquid capable of dissolving the caking additive in the resin coating film 12. Specific examples thereof include water, alcohols, ketones, and carboxylic acid esters, and at least one type among these, or a mixed liquid containing at least one type among these is used.

To the solvent 4, an arbitrary additive may be added as needed. Examples of the additive include a lubricant, a dispersant, a surfactant, and an antistatic agent. Further, as the additive, the below-mentioned caking additive may be contained.

The content ratio of the additive in the solvent 4 is preferably 2.0 mass % or less, more preferably 1.0 mass % or less, further more preferably 0.1 mass % or less. According to this, the viscosity of the solvent 4 is decreased, so that the solvent can be supplied as a smaller liquid droplet. As a result, the positional accuracy of the supply area A1 can be enhanced. Further, in the solvent 4, if the concentration of the additive is sufficiently low, in the below-mentioned degreasing step S06, the amount of the additive to be degreased together with the resin coating film 12 can be suppressed sufficiently small. As a result, the time required for the degreasing step S06 can be shortened, and also a decrease in the mechanical properties of a metal sintered body 10 to be finally obtained and a decrease in the dimensional accuracy thereof can be suppressed.

1.4 Second Powder Layer Formation Step S03

Figure 6:
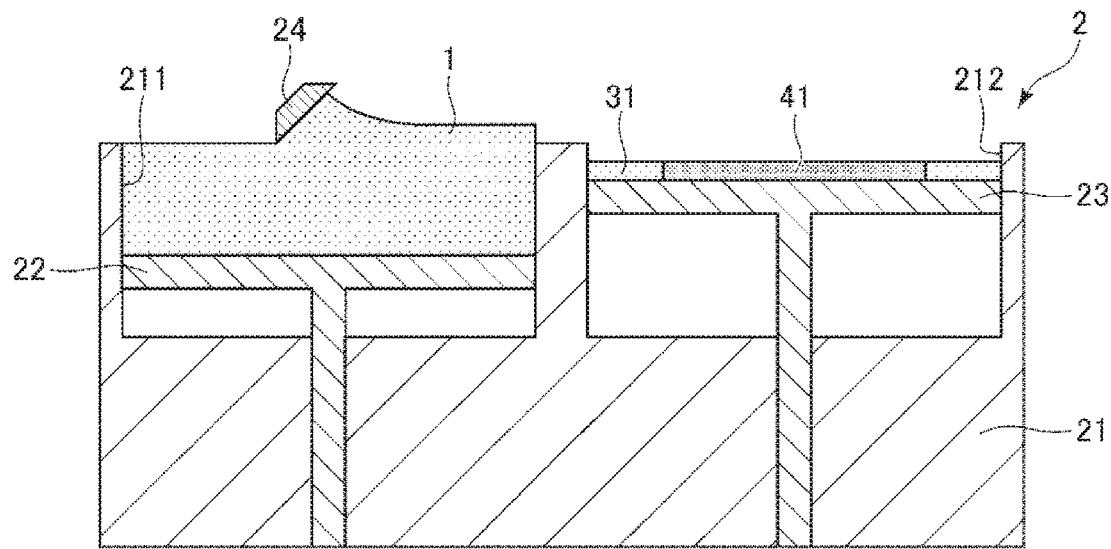
FIG. 6 is a diagram for illustrating the method for producing an additively manufactured body according to the embodiment.
Figure 7:
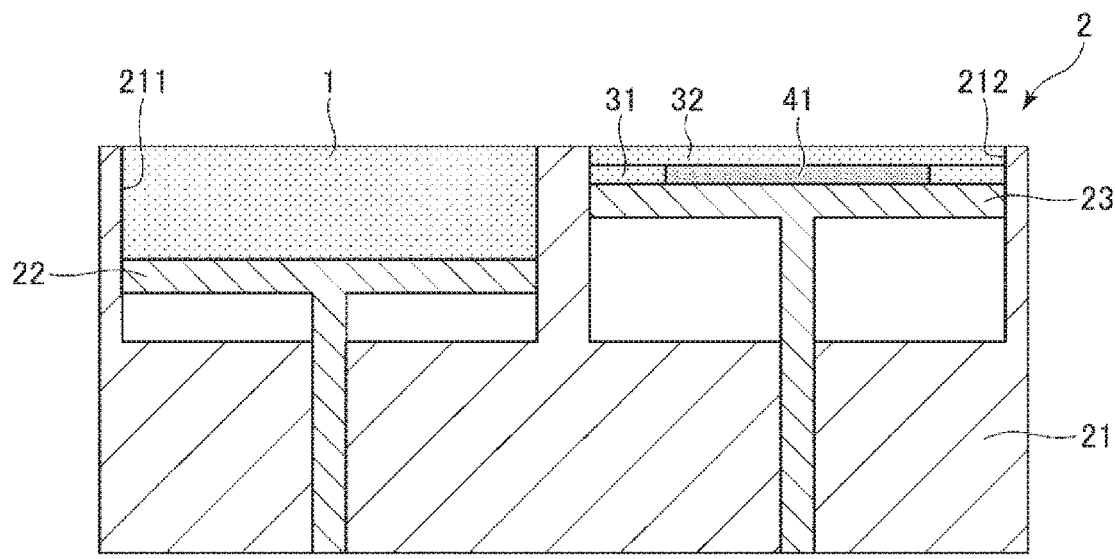
FIG. 7 is a diagram for illustrating the method for producing an additively manufactured body according to the embodiment.

Subsequently, on the first powder layer 31 containing the first binded body 41, the second powder layer 32 is formed by spreading the new powder for additive manufacturing 1. Specifically, as shown in FIG. 6, by using the coater 24, the powder for additive manufacturing 1 stored in the powder storage portion 211 is dragged onto the manufacturing stage 23 and leveled to a uniform thickness. By doing this, the second powder layer 32 shown in FIG. 7 is obtained. At that time, the thickness of the second powder layer 32 can be adjusted in the same manner as in the above-mentioned first powder layer formation step S01 by slightly lowering each of the upper face of the first powder layer 31 and the upper face of the first binded body 41 from the upper end of the manufacturing portion 212 in advance.

1.5 Second Caking Additive Dissolution Step S04

Figure 8:
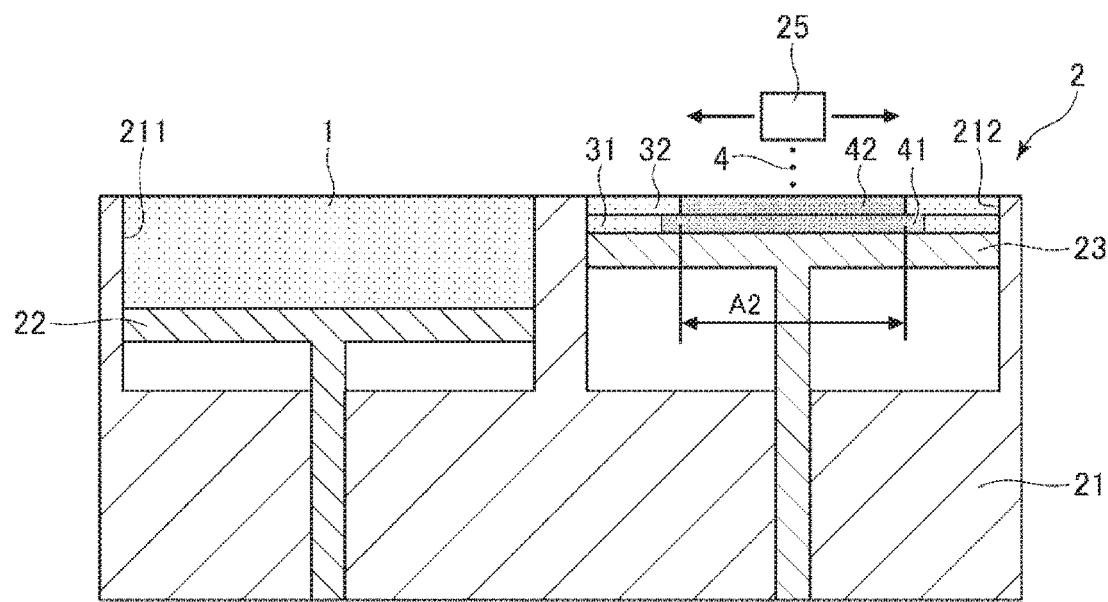
FIG. 8 is a diagram for illustrating the method for producing an additively manufactured body according to the embodiment.

Subsequently, as shown in FIG. 8, the solvent 4 is supplied to a desired supply area A2 of the second powder layer 32 by the solution supply portion 25. By doing this, the caking additive in the resin coating films 12 is dissolved in the coated particles 13 in the supply area A2 in the second powder layer 32. As a result, the resin coating films 12 exhibit a joining property, so that the metal particles 11 are joined to one another through the dissolved material of the caking additive. In this manner, the second binded body 42 located in the supply area A2 is obtained. The second binded body 42 is a body obtained by selectively joining the coated particles 13 in the second powder layer 32 in the supply area A2, and has shape retainability at least to such an extent that the body is not collapsed by its own weight. Further, by setting the supply area A2 so as to overlap with the supply area A1, the second binded body 42 is also joined to the first binded body 41. On the other hand, the area other than the supply area A2 in the second powder layer 32 has almost no shape retainability.

1.6 Stacking Step S05

Subsequently, by repeating the second powder layer formation step S03 and the second caking additive dissolution step S04 once or twice or more, one layer or a plurality of layers of a new second binded body 42 similar to the second binded body 42 is/are stacked on the second binded body 42. By doing this, as shown in FIG. 9, the additively manufactured body 5 having a desired three-dimensional shape is obtained. The additively manufactured body 5 is an assembly composed of the first binded body 41 and one layer or a plurality of layers of the second binded body 42. After the additively manufactured body 5 is recovered, the powder for additive manufacturing 1 which does not constitute the additively manufactured body 5 is recovered separately from the additively manufactured body 5 and reused as needed. Note that this step only need to be performed as needed, and may be omitted when the additively manufactured body 5 is obtained at the stage of completion of the second caking additive dissolution step S04.

1.7 Degreasing Step S06

Subsequently, the additively manufactured body 5 is taken out from the manufacturing portion 212, and is subjected to a degreasing treatment in a degreasing furnace or the like. By doing this, the degreased body 6 shown in FIG. 10 is obtained.

The degreasing treatment is a treatment of removing at least a part of the resin coating film 12 or the like by heating the additively manufactured body 5. Specifically, it is a treatment of heating the additively manufactured body 5, and in one example of the heating conditions, the temperature is 100° C. or higher and 750° C. or lower and the time is 0.1 hours or more and 20 hours or less. Examples of the heating atmosphere include an air atmosphere, an inert gas atmosphere, and a depressurized atmosphere.

The degreasing treatment may be performed continuously with the below-mentioned firing treatment in a firing furnace. That is, the degreasing step S06 may be included in the below-mentioned firing step S07.

1.8 Firing Step S07

Subsequently, the degreased body 6 is fired in a firing furnace or the like. By doing this, as shown in FIG. 11, the metal sintered body 10 that is a sintered body of the powder for additive manufacturing 1 is obtained.

The firing treatment is a treatment of sintering the metal particles in the powder for additive manufacturing 1 by heating the degreased body 6. In one example of the heating conditions, the temperature is 980° C. or higher and 1330° C. or lower and the time is 0.2 hours or more and 7 hours or less. Examples of the heating atmosphere include an air atmosphere, an inert gas atmosphere, and a depressurized atmosphere.

When the above-mentioned degreasing step S06 is performed continuously with the firing step S07, the additively manufactured body 5 only need to be placed in a firing furnace or the like.

As described above, the method for producing an additively manufactured body according to this embodiment is a method for producing the additively manufactured body 5 by a three-dimensional additive manufacturing method, and includes the first powder layer formation step S01 and the second powder layer formation step S03, each of which is a powder layer formation step, and the first caking additive dissolution step S02 and the second caking additive dissolution step S04, each of which is a caking additive dissolution step.

Among these, the first powder layer formation step S01 and the second powder layer formation step S03 are steps of forming the first powder layer 31 and the second powder layer 32 using the powder for additive manufacturing 1 including the coated particles 13 each containing the metal particle 11 and the resin coating film 12 that covers the metal particle 11 and contains a caking additive.

Further, the first caking additive dissolution step S02 and the second caking additive dissolution step S04 are steps of forming the first binded body 41 and the second binded body 42 by supplying the solvent 4 to the supply area A1 of the first powder layer 31 and the supply area A2 of the second powder layer 32 so as to dissolve the caking additive in the first powder layer 31 and the second powder layer 32 and join the metal particles 11 to one another in the supply areas A1 and A2.

Then, the ratio $t/D50$ of the average thickness $t$ of the resin coating films 12 to the average particle diameter $D50$ of the metal particles 11 satisfies the following relationship: $0.0001 \leq t/D50 \leq 0.0010$.

According to such a production method, even when the average particle diameter D50 of the metal particles 11 is small, that is, even when fine metal particles are used as the metal particles 11, the time required for the degreasing treatment of the additively manufactured body 5 can be shortened. Therefore, the additively manufactured body 5 capable of efficiently producing the metal sintered body 10 having a high density, high dimensional accuracy, and high surface accuracy derived from the fine metal particles 11 can be obtained.

The method for producing the metal sintered body 10 according to this embodiment includes the degreasing step S06 of subjecting the additively manufactured body 5 produced by the above-mentioned method for producing an additively manufactured body to a degreasing treatment, thereby obtaining the degreased body 6, and the firing step S07 of firing the degreased body 6, thereby obtaining the metal sintered body 10.

According to such a production method, the additively manufactured body 5 can be sintered while suppressing deformation and occurrence of a crack or the like by making use of the fact that the total amount of the resin coating films 12 or the like in the additively manufactured body 5 is smaller than in the related art. According to this, the metal sintered body 10 having a high density, high dimensional accuracy, and high surface accuracy is obtained.

2. Powder for Additive Manufacturing

Next, the powder for additive manufacturing according to the embodiment will be described.

The powder for additive manufacturing 1 according to this embodiment is a powder to be used in a three-dimensional additive manufacturing method and is a powder including the plurality of coated particles 13 each containing the metal particle 11 and the resin coating film 12 that covers the metal particle 11 and contains a caking additive as shown in FIG. 12. In other words, the powder for additive manufacturing 1 is mainly constituted by an assembly of the coated particles 13. Then, the ratio t/D50 of the average thickness t of the resin coating films 12 to the average particle diameter D50 of the metal particles 11 in the powder for additive manufacturing 1 satisfies the following relationship: $0.0001 \leq t/D50 \leq 0.0010$.

According to such a powder for additive manufacturing 1, even when the average particle diameter D50 of the metal particles 11 is small, that is, even when fine metal particles are used as the metal particles 11, the time required for the degreasing treatment of the additively manufactured body 5 can be shortened. As a result, the additively manufactured body 5 capable of efficiently producing the metal sintered body 10 having a high density and high surface accuracy can be realized. Further, such an additively manufactured body 5 has high shape retainability and has such a mechanical strength that deformation hardly occurs. Due to this, the metal sintered body 10 having high dimensional accuracy can be finally produced.

Further, according to such a powder for additive manufacturing 1, the total amount of the resin coating films 12 or the like to be used when producing the additively manufactured body 5 can be decreased as compared with the related art. Therefore, the total amount of a resin component of the resin coating films 12 or the like with respect to the metal particles 11 in the additively manufactured body 5 can be decreased, so that the amount of removal of the resin coating films 12 or the like, that is, the amount of removal of the resin component in the degreasing treatment can also be naturally decreased. As a result, a change in the dimension of the additively manufactured body 5, deterioration of the quality thereof, or the like when removing the resin coating films 12 or the like can be suppressed, and thus, the metal sintered body 10 having high quality can be produced. Further, in the metal sintered body 10, carbon or a carbide becomes less likely to remain. Such a component causes a decrease in the mechanical strength of the metal sintered body 10. Therefore, if the residual amount of carbon or the like in the metal sintered body 10 can be decreased, the mechanical strength of the metal sintered body 10 can be increased.

2.1 Metal Particles

The average particle diameter D50 of the metal particles 11 is preferably 0.1 µm or more and 5.0 µm or less, more preferably 0.5 µm or more and 4.5 µm or less, further more preferably 1.0 µm or more and 4.0 µm or less. By using the metal particles 11 having such a relatively small particle diameter, the additively manufactured body 5 having a good sinterability can be realized. That is, the fillability of the coated particles 13 is high, and the additively manufactured body 5 that is easily sintered even when the total amount of the resin coating films 12 or the like is decreased can be realized, and therefore, by subjecting such an additively manufactured body 5 to a firing treatment, the density and the strength of the metal sintered body 10 can be finally increased. In addition, in the method for producing an additively manufactured body described above, the accuracy of the boundary of the supply regions A1 and A2 is easily enhanced. Due to this, the additively manufactured body 5 having high shape accuracy and high dimensional accuracy can be produced, and accompanying this, the metal sintered body 10 having high shape accuracy and high dimensional accuracy can be produced.

The average particle diameter D50 described above refers to a particle diameter at a cumulative frequency of 50% from a small diameter side in a particle size distribution on a mass basis obtained using a laser diffraction-type particle size distribution analyzer with respect to a plurality of metal particles 11.

The specific surface area of the metal particle 11 is not particularly limited, but is preferably 0.05 m$^2$/g or more and 1.00 m$^2$/g or less, more preferably 0.10 m$^2$/g or more and 0.75 m$^2$/g or less, further more preferably 0.20 m$^2$/g or more and 0.50 m$^2$/g or less. When the specific surface area of the metal particle 11 is within the above range, the sinterability of the metal particles 11 and the flowability and the fillability of the powder for additive manufacturing 1 can be simultaneously achieved.

When the specific surface area is less than the above lower limit, the sinterability of the metal particles 11 may be deteriorated. On the other hand, when the specific surface area exceeds the above upper limit, the flowability or the fillability of the powder for additive manufacturing 1 may be deteriorated.

The specific surface area of the metal particle 11 can be measured, for example, using a BET specific surface area measuring device HM-1201-010 manufactured by Mountech Co., Ltd. In that case, the amount of a specimen may be set to, for example, 5 g.

The constituent material of the metal particle 11 is not particularly limited, and may be any material as long as it has sinterability. As an example, a simple substance such as Fe, Ni, Co, Ti, Mg, Cu, or Al, or an alloy, an intermetallic compound, or the like containing such a simple substance as a main component is exemplified.

Among these, as an Fe-based alloy, for example, stainless steel such as austenitic stainless steel, martensitic stainless steel, or precipitation hardening stainless steel, low carbon steel, carbon steel, heat-resistant steel, die steel, high-speed steel, an Fe—Ni alloy, an Fe—Ni—Co alloy, or the like is exemplified.

Further, as a Ni-based alloy, for example, a Ni—Cr—Fe-based alloy, a Ni—Cr—Mo-based alloy, a Ni—Fe-based alloy, or the like is exemplified.

Further, as a Co-based alloy, for example, a Co—Cr-based alloy, a Co—Cr—Mo-based alloy, a Co—Al—W-based alloy, or the like is exemplified.

Further, as a Ti-based alloy, for example, an alloy of Ti with a metal element such as Al, V, Nb, Zr, Ta, or Mo is exemplified, and specifically, Ti-6Al-4V, Ti-6Al-7Nb, or the like is exemplified.

The metal particles 11 may be those produced by any method, but are preferably a powder produced by an atomization method such as a water atomization method, a gas atomization method, or a spinning water atomization method, and more preferably a powder produced by a water atomization method or a spinning water atomization method. These can be produced at low cost even if they are a powder having a small average particle diameter D50, and therefore are useful as the metal particles 11.

Further, the metal particles 11 may be subjected to various pretreatments such as a heating treatment, a plasma treatment, an ozone treatment, and a reducing treatment.

2.2 Resin Coating Film

The resin coating film 12 contains a caking additive and covers the surface of the metal particle 11 as described above.

The caking additive may be any as long as it is a material that is dissolved by contact with the solvent 4 and can exhibit a joining property.

Examples of the caking additive include polyolefins such as polyethylene, polypropylene, and an ethylene-vinyl acetate copolymer, fluororesins such as polytetrafluoroethylene, polychlorotrifluoroethylene, and polyvinylidene fluoride, acrylic resins such as polymethyl methacrylate and polybutyl methacrylate, styrenic resins such as polystyrene, epoxy resins, polyesters such as polyethylene terephthalate and polybutylene terephthalate, rubber components such as polyisobutylene, polyisoprene, chloroprene rubber, butyl rubber, silicone rubber, fluororubber, acrylic rubber, urethane rubber, ethylene propylene rubber, butadiene rubber, acrylonitrile butadiene rubber, and styrene butadiene rubber, polyvinyl chloride, polyvinylidene chloride, polyamides such as nylon, polyether, vinylon, polyvinyl alcohol, polyvinylpyrrolidone, and copolymers thereof, polyethylene glycol, acetyl cellulose, various types of waxes, paraffins, higher fatty acids, higher alcohols, higher fatty acid esters, and higher fatty acid amides, and among these, one type or two or more types are used.

The content of the caking additive in the resin coating film 12 is not particularly limited, but is preferably 30 mass % or more, more preferably 50 mass % or more and 99 mass % or less. According to this, the resin coating film 12 exhibits a sufficient joining property by contact with the solvent 4.

The resin coating film 12 preferably has hydrophobicity. In order for the resin coating film 12 to have hydrophobicity, for example, it is only necessary to use an organic material having hydrophobicity as the caking additive. When the resin coating film 12 has hydrophobicity, the hygroscopicity of the resin coating film 12 can be decreased. According to this, exhibition of adhesiveness of the resin coating film 12 due to moisture absorption can be suppressed. As a result, aggregation of the coated particles 13 is suppressed, and also a decrease in the flowability of the powder for additive manufacturing 1 due to moisture absorption can be suppressed.

The organic material having hydrophobicity refers to an organic material whose main chain is a chain hydrocarbon or a cyclic hydrocarbon. Such an organic material tends to have low hygroscopicity and is useful as the caking additive.

Examples of the chain hydrocarbon include an alkane, an alkene, and an alkyne, and from the viewpoint of having high hydrophobicity, an alkane is more preferred.

Examples of the cyclic hydrocarbon include a cycloalkane, a cycloalkene, and an aromatic hydrocarbon, and from the viewpoint of having high hydrophobicity, a cycloalkane or an aromatic hydrocarbon is more preferred.

In particular, the caking additive preferably contains at least one type of polyethylene, polypropylene, polyisobutylene, polyisoprene, and polyvinylidene fluoride among the above-mentioned materials. These materials have a structure with relatively low hygroscopicity. The structure with low hygroscopicity is a molecular structure having the above-mentioned main chain, and also is a structure having no functional groups for increasing hygroscopicity such as an amide bond, an ester bond, and a cyano bond. Therefore, the caking additive containing such a material can suppress aggregation of the coated particles 13, and also can realize the powder for additive manufacturing 1 having high flowability.

In particular, the caking additive more preferably contains polyisobutylene or polyisoprene among these materials.

Polyisobutylene is a polymer containing a repeat unit represented by —[C(CH$_3$)$_2$CH$_2$]— in a main chain. Examples of polyisobutylene include Glissopal and Oppanol manufactured by BASF Co., Ltd., Tetrax and Himol manufactured by JXTG Nippon Oil & Energy Corporation, and butyl rubber manufactured by Japan Butyl Co., Ltd.

The weight average molecular weight of polyisobutylene is preferably 10,000 or more and 300,000 or less, more preferably 15,000 or more and 100,000 or less. When the weight average molecular weight of polyisobutylene is within the above range, the joining property of the caking additive becomes sufficiently high, and also the followability of the resin coating film 12 to the metal particle 11 becomes favorable.

Polyisoprene is a polymer containing a repeat unit represented by —[C(CH$_3$)=CHCH$_2$CH$_2$]— in a main chain. Examples of polyisoprene in this application include terminal-modified polyisoprene, hydrogenated polyisoprene, partially hydrogenated polyisoprene, and polyisoprene polyol. As an example, Kuraprene LIR series manufactured by Kuraray Co., Ltd., or the like is exemplified.

The weight average molecular weight of polyisoprene is preferably 5,000 or more and 500,000 or less, more preferably 8,000 or more and 200,000 or less. When the weight average molecular weight of polyisoprene is within the above range, the joining property of the caking additive becomes sufficiently high, and also the followability of the resin coating film 12 to the metal particle 11 becomes favorable.

The weight average molecular weight is, for example, a weight average molecular weight in terms of polystyrene measured by gel permeation chromatography (GPC) using a Shodex K-804 (polystyrene gel) column manufactured by Showa Denko K.K., and a chloroform mobile phase in a GPC system manufactured by Waters, Inc.

To the resin coating film 12, an arbitrary additive other than the caking additive may be added as needed.

Examples of the additive include a surfactant, an antistatic agent, a lubricant, a dispersant, a plasticizer, a curing agent, a crosslinking agent, an antioxidant, an anti-aging agent, an anti-rust agent, a preservative, a degreasing accelerator, a diluent, a filler, and a thickener.

Among these, examples of the surfactant include various types of anionic surfactants such as an oleate salt, a carboxylate salt, a sulfonate salt, a sulfate ester salt, and a phosphate ester salt, various types of cationic surfactants such as an amino acid salt and a quaternary ammonium salt, various types of nonionic surfactants such as an ester type such as a glycerin fatty acid ester, an ether type such as a polyoxyethylene alkyl ether and a polyoxyethylene alkyl phenyl ether, and an ester-ether type such as fatty acid polyethylene glycol, and various types of amphoteric surfactants such as an alkyl betaine.

As the antistatic agent, for example, not only a silica-based antistatic agent, but also the above-mentioned surfactant functions as the antistatic agent. Further, as a method for applying the antistatic agent, a coating type, a kneading type, and the like are known, however, a kneading type is preferably used in consideration of more reliable film formation of the resin coating film 12.

In view of the above, the resin coating film 12 preferably contains at least a surfactant. According to this, when the resin coating film 12 is formed, the surface tension of a liquid containing the coating film material can be decreased. As a result, the wettability of the coating film material to the surface of the metal particle 11 can be enhanced, and the adhesion of the resin coating film 12 can be enhanced.

Further, as described above, the surfactant also functions as the antistatic agent. Specifically, the surfactant adsorbs moisture on the surface of the metal particle 11 and acts to decrease the electric resistance. As a result, a problem such as aggregation of the coated particles 13 due to an electrostatic action or a decrease in the flowability of the powder for additive manufacturing 1 can be suppressed. Therefore, by including the surfactant, even when the fine metal particles 11 are used, the powder for additive manufacturing 1 having excellent flowability can be realized.

Examples of the lubricant include dimethylpolysiloxane and a modified material thereof, a carboxyl-modified silicone, an α-methylstyrene-modified silicone, an α-olefin-modified silicone, a polyether-modified silicone, a fluorine-modified silicone, a hydrophilic specially modified silicone, an olefin/polyether-modified silicone, an epoxy-modified silicone, an amino-modified silicone, an amide-modified silicone, and an alcohol-modified silicone.

Examples of the plasticizer include a phthalate ester, an adipate ester, a trimellitate ester, and a sebacate ester.

Further, the glass transition temperature of the caking additive is preferably room temperature or lower. Specifically, the glass transition temperature is preferably 25° C. or lower, more preferably 15° C. or lower. By using the caking additive having such a glass transition temperature, when the resin coating film 12 is formed, the temperature in the coating film material becomes higher than the glass transition temperature of the caking additive. Due to this, when the surfactant is contained in the coating film material, the caking additive in the coating film material is softened, and along with this, the coating film material is also softened. In such a case, the surfactant becomes easy to move, and the probability that the surfactant moves to the surface of the metal particle 11 increases. As a result, the action of the surfactant such that the adhesion of the coating film material is enhanced or the electric resistance is decreased is exhibited, and the powder for additive manufacturing 1 having particularly excellent flowability can be realized.

The glass transition temperature of the caking additive can be measured by a dynamic viscoelasticity measuring method (DMA method).

The addition amount of each of these additives is preferably about 0.01 mass % or more and 5.0 mass % or less, more preferably about 0.05 mass % or more and 3.0 mass % or less with respect to the resin coating film 12. Further, the total addition amount of the additives is preferably 10.0 mass % or less with respect to the resin coating film 12. According to this, the functions of the additives can be imparted to the resin coating film 12 without inhibiting the function of the caking additive.

Here, as described above, the ratio $t/D50$ of the average thickness $t$ of the resin coating films 12 to the average particle diameter $D50$ of the metal particles 11 satisfies the following relationship: $0.0001 \le t/D50 \le 0.0010$.

According to such a powder for additive manufacturing 1, even when the average particle diameter $D50$ of the metal particles 11 is small, the time required for the degreasing treatment of the additively manufactured body 5 can be shortened. As a result, the metal sintered body 10 having a high density and high surface accuracy can be efficiently produced.

Further, the total amount of the resin coating films 12 or the like used when producing the additively manufactured body 5 can be decreased, so that a change in the dimension of the additively manufactured body 5, deterioration of the quality thereof, or the like when removing the resin component can be suppressed. As a result, the metal sintered body 10 having a high density and a high strength, and also having high dimensional accuracy can be produced.

The ratio $t/D50$ of the average thickness $t$ of the resin coating films 12 to the average particle diameter $D50$ of the metal particles 11 is set to preferably 0.0001 or more and 0.0005 or less, more preferably 0.0001 or more and 0.0003 or less. According to this, the above-mentioned effect becomes more prominent.

The ratio $t/D50$ of the average thickness $t$ of the resin coating films 12 to the average particle diameter $D50$ of the metal particles 11 can be determined as follows. The following unit is an example, and calculation for adjusting a unit difference is added as needed.

First, the average particle diameter $D50$ [μm] of the metal particles 11 is determined.

Subsequently, the mass of the coating film material used for forming the resin coating films 12 is measured, and the mass of the coating film material with respect to the mass of the metal particles 11 is calculated as a "coating film material addition ratio [mass %]".

Subsequently, the coating film material addition ratio [mass %] is divided by the specific surface area [m$^2$/g] of the metal particles 11 used to calculate a "coating amount [g/m$^2$]".

Subsequently, the coating amount is divided by the density [g/m$^3$] of the coating film material used. By doing this, the average thickness $t$ [nm] of the resin coating films 12 is calculated. As a result, the "ratio $t/D50$" to be determined is obtained.

To the powder for additive manufacturing 1, an element other than the metal particle 11 and the resin coating film 12 may be added. For example, another coating film or the like may be added to the surface of the resin coating film 12.

Further, the powder for additive manufacturing 1 may also contain different particles other than the coated particles 13 described above. Examples of the different particles include metal particles, ceramic particles, and resin particles. Among these, the metal particles and the ceramic particles contribute to the production of a composite material by being fired together with the coated particles 13. Further, the resin particles can, for example, add a resin component to the powder for additive manufacturing 1.

In that case, the proportion of the coated particles 13 in the powder for additive manufacturing 1 is preferably 80 vol % or more, more preferably 90 vol % or more. According to this, the effect as described above can be more reliably exhibited.

3. Method for Producing Powder for Additive Manufacturing

Next, a method for producing the powder for additive manufacturing 1 will be described.

The method for producing the powder for additive manufacturing 1 may be any method as long as it is a method capable of adhering the coating film material to the surface of the metal particle 11.

As one example, a method in which the metal particles 11 are fed into a liquid containing the coating film material, thereby preparing a slurry, and thereafter, the slurry is dried by heating, followed by grinding is exemplified. In that case, in the heating of the slurry, for example, any of various types of granulators such as a spray dryer, an extrusion granulator, a fluidized bed granulator, and an agitation granulator, various types of mixers such as a dry mixer and a wet mixer, or the like is used. Further, in the grinding, for example, a jet mill, a pin mill, an atomizer, or the like is used.

As another example, a method in which the metal particles 11 are granulated using a liquid containing the coating film material, followed by grinding is exemplified. In that case, in the granulation, any of various types of granulators is used.

As yet another example, a method in which a liquid containing the coating film material is sprayed while allowing the metal particles 11 to flow in a tank, thereby coating the metal particles with the coating film material is exemplified. In the method, a tumbling fluidized bed coating device, a fluidized bed coating device, a composite type fluidized bed coating device, or the like is used.

4. Additively Manufactured Body

The additively manufactured body 5 obtained in the above-mentioned stacking step S05 includes the powder for additive manufacturing 1. The additively manufactured body 5 is produced by the above-mentioned three-dimensional additive manufacturing method, and has a desired three-dimensional shape. As described above, the powder for additive manufacturing 1 has high flowability even when the fine metal particles 11 are used. Due to this, even in the three-dimensional additive manufacturing method, the thickness of each of the first powder layer 31 and the second powder layer 32 can be made thin, and therefore, the additively manufactured body 5 having high dimensional accuracy can be produced. In addition, while the additively manufactured body 5 has shape retainability necessary for maintaining its shape, the total amount of the resin coating films 12 or the like used is less than in the related art. Due to this, since the amount of the resin component to be removed in the degreasing step S06 is small, the amount of deformation due to the degreasing treatment is also suppressed small. As a result, the metal sintered body 10 having high dimensional accuracy can be produced.

Hereinabove, the powder for additive manufacturing, the additively manufactured body, the method for producing an additively manufactured body, and the method for producing a metal sintered body according to the present disclosure have been described with reference to the embodiment illustrated in the drawings, however, the present disclosure is not limited thereto, and for example, in each of the powder for additive manufacturing according to the present disclosure and the additively manufactured body according to the present disclosure, the component included in the embodiment may be replaced with another component having a similar function, or an arbitrary component may be added to the embodiment.

Further, in each of the method for producing an additively manufactured body and the method for producing a metal sintered body according to the present disclosure, the step included in the embodiment may be replaced with another step to be performed for a similar purpose, or a step for an arbitrary purpose may be added to the embodiment.

EXAMPLES

Next, specific Examples of the present disclosure will be described.

5. Production of Additively Manufactured Body

Example 1

First, a resin coating film was formed on the particles of SUS 316L stainless steel powder produced by a water atomization method, whereby a powder for additive manufacturing was obtained. As the coating film material, a solution was prepared by dissolving polyisobutylene that is a caking additive in isopropyl ether and used. Further, as an additive, a nonionic surfactant was used. Various conditions for the powder for additive manufacturing are shown in Table 1. The glass transition temperature of polyisobutylene was −60° C.

Subsequently, an additively manufactured body in which 50 layers are stacked was produced by a three-dimensional additive manufacturing method using the powder for additive manufacturing.

Specifically, after a first powder layer was formed, isopropyl ether that is a solvent was sprayed onto a partial area of the first powder layer, whereby a first binded body in which the particles in the area are joined to one another was obtained. Subsequently, after a second powder layer was formed on the first binded body, isopropyl ether that is a solvent was sprayed onto a partial area of the second powder layer, whereby a second binded body in which the particles in the area are joined to one another was obtained. Thereafter, 50 layers of the binded body were stacked by repeating these steps, whereby an additively manufactured body having a desired shape was obtained.

Examples 2 to 10

Additively manufactured bodies were obtained in the same manner as in Example 1 except that the production conditions for the powder for additive manufacturing were changed as shown in Table 1. Note that among the steel types shown in Table 1, SUS 630 is SUS 630 stainless steel, SUS 304L is SUS 304L stainless steel, and SUS 420J2 is SUS 420J2 stainless steel. Further, SCM 415 is a steel type classified into chromium-molybdenum steel among alloy steels for machine structural use specified in JIS G 4053: 2008.

Comparative Examples 1 to 10

Additively manufactured bodies were obtained in the same manner as in Example 1 except that the production conditions for the powder for additive manufacturing were changed as shown in Table 1.

6. Evaluation of Powder for Additive Manufacturing 6.1 Secondary Particles

With respect to the powders for additive manufacturing used in the respective Examples and the respective Comparative Examples, observation with an electron microscope was carried out. Then, the confirmation results in the observed images were evaluated according to the following evaluation criteria. Note that the term "secondary particles" in the evaluation criteria refers to an aggregate obtained by aggregating the metal particles.

Evaluation Criteria for Secondary Particles

A: The number of secondary particles that can be confirmed in the observed image is 10% or less.

B: The number of secondary particles that can be confirmed in the observed image is more than 10% and 30% or less.

C: The number of secondary particles that can be confirmed in the observed image is more than 30%.

The above evaluation results are shown in Table 1.

6.2 Flowability

With respect to the powders for additive manufacturing obtained in the respective Examples and the respective Comparative Examples, the flow rate was measured by the test method for flowability of metal powders specified in JIS Z 2502. Then, the measured flow rate was evaluated according to the following evaluation criteria.

Evaluation Criteria for Flowability

A: The flowability is high.

B: The flowability is slightly high.

C: The flowability is low.

The above evaluation results are shown in Table 1.

7. Evaluation of Additively Manufactured Body

The additively manufactured bodies obtained in the respective Examples and the respective Comparative Examples were compressed, and the compressive strength at collapse was measured. Then, this was regarded as the mechanical strength of the additively manufactured body and evaluated according to the following evaluation criteria.

Evaluation Criteria for Compressive Strength

A: The compressive strength is high.

B: The compressive strength is slightly high.

C: The compressive strength is low.

The above evaluation results are shown in Table 1.

8. Evaluation of Metal Sintered Body 8.1 Appearance

The additively manufactured bodies obtained in the respective Examples and the respective Comparative Examples were subjected to a degreasing treatment and a firing treatment, whereby metal sintered bodies were obtained. Subsequently, the appearance of the obtained metal sintered bodies was visually observed. Then, the observation results were evaluated according to the following evaluation criteria.

Evaluation Criteria for Appearance

A: No appearance defects such as deformation and a crack were observed.

B: A few appearance defects such as deformation and a crack were observed.

C: Many appearance defects such as deformation and a crack were observed.

The above evaluation results are shown in Table 1.

8.2 Mechanical Strength

A bar-shaped test piece was cut out from each of the metal sintered bodies obtained in 8.1. Subsequently, the obtained test piece was subjected to a tensile test, and a tensile strength was measured. Then, the measurement result was evaluated according to the following evaluation criteria.

Evaluation Criteria for Tensile Strength

A: The tensile strength is high.

B: The tensile strength is slightly high.

C: The tensile strength is low.

The above evaluation results are shown in Table 1.

8.3 Residual Carbon

Each of the metal sintered bodies obtained in 8.1 was cut, and the cross section was subjected to a qualitative and quantitative analysis. Then, the content of carbon was evaluated according to the following evaluation criteria.

Evaluation Criteria for Residual Carbon

A: The amount of residual carbon is large.

B: The amount of residual carbon is slightly large.

C: The amount of residual carbon is small.

The above evaluation results are shown in Table 1.

TABLE 1

| | Various production conditions | | | | | |
|---|---|---|---|---|---|---|
| | Metal particles | | Coating film | Powder for additive manufacturing | | |
| | Steel type | Average particle diameter [μm] | Specific surface area [m$^2$/g] | material Addition ratio [mass %] | Coating amount [g/m$^2$] | Average film thickness [nm] | Ratio of average thickness of resin coating films to average particle diameter of metal particles |

| | Steel type | Average particle diameter [μm] | Specific surface area [m$^2$/g] | material Addition ratio [mass %] | Coating amount [g/m$^2$] | Average film thickness [nm] | Ratio of average thickness of resin coating films to average particle diameter of metal particles |
|---|---|---|---|---|---|---|---|
| Example 1 | 316L | 4.12 | 0.375 | 0.02 | 0.0005 | 0.53 | 0.00013 |
| Example 2 | 630 | 3.95 | 0.442 | 0.04 | 0.0009 | 0.90 | 0.00023 |
| Example 3 | 304L | 3.85 | 0.385 | 0.03 | 0.0008 | 0.78 | 0.00020 |
| Example 4 | 420J2 | 4.28 | 0.424 | 0.05 | 0.0012 | 1.18 | 0.00028 |
| Example 5 | SCM415 | 4.45 | 0.452 | 0.05 | 0.0011 | 1.11 | 0.00025 |
| Example 6 | 316L | 4.12 | 0.375 | 0.10 | 0.0027 | 2.67 | 0.00065 |
| Example 7 | 630 | 3.95 | 0.442 | 0.15 | 0.0034 | 3.39 | 0.00086 |
| Example 8 | 304L | 3.85 | 0.385 | 0.10 | 0.0026 | 2.60 | 0.00067 |
| Example 9 | 420J2 | 4.28 | 0.424 | 0.15 | 0.0035 | 3.54 | 0.00083 |
| Example 10 | SCM415 | 4.45 | 0.452 | 0.20 | 0.0044 | 4.42 | 0.00099 |
| Comparative Example 1 | 316L | 4.12 | 0.375 | 0.01 | 0.0003 | 0.27 | 0.00006 |
| Comparative Example 2 | 630 | 3.95 | 0.442 | 0.01 | 0.0002 | 0.23 | 0.00006 |
| Comparative Example 3 | 304L | 3.85 | 0.385 | 0.01 | 0.0003 | 0.26 | 0.00007 |

TABLE 1-continued

| | | | | | | | |
|---|---|---|---|---|---|---|---|
| Comparative Example 4 | 420J2 | 4.28 | 0.424 | 0.01 | 0.0002 | 0.24 | 0.00006 |
| Comparative Example 5 | SCM415 | 4.45 | 0.452 | 0.01 | 0.0002 | 0.22 | 0.00005 |
| Comparative Example 6 | 316L | 4.12 | 0.375 | 0.50 | 0.0133 | 13.33 | 0.00324 |
| Comparative Example 7 | 630 | 3.95 | 0.442 | 0.70 | 0.0158 | 15.84 | 0.00401 |
| Comparative Example 8 | 304L | 3.85 | 0.385 | 0.60 | 0.0156 | 15.58 | 0.00405 |
| Comparative Example 9 | 420J2 | 4.28 | 0.424 | 0.70 | 0.0165 | 16.51 | 0.00386 |
| Comparative Example 10 | SCM415 | 4.45 | 0.452 | 0.80 | 0.0177 | 17.70 | 0.00398 |

| | Evaluation results | | | | | |
|---|---|---|---|---|---|---|
| | Powder for additive manufacturing | | Additively manufactured body | Metal sintered body | | |
| | Secondary particles | Flowability | Mechanical strength | Appearance | Mechanical strength | Residual carbon |
| Example 1 | A | A | A | A | A | A |
| Example 2 | A | A | A | A | A | A |
| Example 3 | A | A | A | A | A | A |
| Example 4 | A | A | A | A | A | A |
| Example 5 | A | A | A | A | A | A |
| Example 6 | B | B | B | B | B | B |
| Example 7 | B | B | B | B | B | B |
| Example 8 | B | B | B | B | B | B |
| Example 9 | B | B | B | B | B | B |
| Example 10 | B | B | B | B | B | B |
| Comparative Example 1 | C | C | Unmeasurable | | Unevaluable | |
| Comparative Example 2 | C | C | Unmeasurable | | Unevaluable | |
| Comparative Example 3 | C | C | Unmeasurable | | Unevaluable | |
| Comparative Example 4 | C | C | Unmeasurable | | Unevaluable | |
| Comparative Example 5 | C | C | Unmeasurable | | Unevaluable | |
| Comparative Example 6 | C | A | B | C | C | C |
| Comparative Example 7 | C | A | B | C | C | C |
| Comparative Example 8 | C | A | B | C | C | C |
| Comparative Example 9 | C | A | B | C | C | C |
| Comparative Example 10 | C | A | B | C | C | C |

As apparent from Table 1, in the respective Examples, for example, even when fine particles having an average particle diameter of 5 μm or less were used as the metal particles, powders for additive manufacturing that hardly cause aggregation, poor flowability, or the like could be obtained.

In addition, in the respective Examples, additively manufactured bodies having a high mechanical strength were obtained.

Further, by firing the additively manufactured bodies obtained in the respective Examples, metal sintered bodies that have a few appearance defects such as deformation and a crack and have a high mechanical strength were obtained. In addition, it could also be confirmed that the amount of residual carbon is small in the thus obtained metal sintered bodies.

From the above results, it was confirmed that according to the present disclosure, even when a fine metal powder is used, the amount of the caking additive used can be decreased, and also in such a case, a high-quality additively manufactured body and a high-quality metal sintered body can be produced. Based on this, it was confirmed that with the use of the powder for additive manufacturing according to the present disclosure, the time required for the degreasing treatment can be shortened.

Note that in each of Comparative Examples 1 to 5, the shape of the additively manufactured body could not be maintained, and therefore, the evaluation of the additively manufactured body and the evaluation of the metal sintered body were not performed.

Further, also when polyisoprene having a glass transition temperature of −70° C., polyvinylidene fluoride having a glass transition temperature of −40° C., polypropylene having a glass transition temperature of −20° C., and polyethylene having a glass transition temperature of −110° C. were used as the caking additive, the same results as in the above-mentioned Examples using polyisobutylene as the caking additive were obtained.

What is claimed is:

1. A powder for additive manufacturing, which is a powder to be used in a three-dimensional additive manufacturing method, comprising:
   a plurality of coated particles containing
   metal particles, and
   resin coating films that cover the metal particles and contain a caking additive, wherein
   the caking additive includes polyisobutylene,
   an average molecular weight of the polyisobutylene is 5000 or more and 500000 or less,
   $0.0001 \leq t/D50 \leq 0.0010$ in which t is an average thickness of the resin coating films and D50 is an average particle diameter of the metal particles, and
   a specific surface area of each of the metal particles is 0.05 m$^2$/g or more and 0.50 m$^2$/g or less.

2. The powder for additive manufacturing according to claim 1, wherein the average particle diameter D50 of the metal particles is 0.1 μm or more and 5.0 μm or less.

3. The powder for additive manufacturing according to claim 1, wherein the resin coating films have hydrophobicity.

4. The powder for additive manufacturing according to claim 1, wherein the resin coating films contain a surfactant.

5. The powder for additive manufacturing according to claim 1, wherein the caking additive has a glass transition temperature of room temperature or lower.

6. A method for producing an additively manufactured body, which is a method for producing the additively manufactured body by a three-dimensional additive manufacturing method, comprising:
   a powder layer formation step of forming a powder layer using a powder for additive manufacturing including a plurality of coated particles containing metal particles and resin coating films that cover the metal particles and contain a caking additive, wherein
   the caking additive includes polyisobutylene,
   an average molecular weight of the polyisobutylene is 5000 or more and 500000 or less, and
   $0.0001 \leq t/D50 \leq 0.0010$ in which t is an average thickness of the resin coating films and D50 is an average particle diameter of the metal particles; and
   a caking additive dissolution step of dissolving the caking additive in the powder layer by supplying a solvent to a supply area of the powder layer so as to join the metal particles to one another in the supply area, thereby obtaining a binded body, wherein
   a specific surface area of each of the metal particles is 0.05 m$^2$/g or more and 0.50 m$^2$/g or less.

7. A method for producing a metal sintered body, comprising:
   a degreasing step of subjecting an additively manufactured body produced by the method for producing the additively manufactured body according to claim 6 to a degreasing treatment, thereby obtaining a degreased body; and
   a firing step of firing the degreased body, thereby obtaining a metal sintered body.

8. The powder for additive manufacturing according to claim 1, wherein an average molecular weight of the caking additive is 5000 or more and 500000 or less.

\* \* \* \* \*